United States Patent [19]
Wilkes et al.

[11] Patent Number: 5,632,703
[45] Date of Patent: May 27, 1997

[54] DEVICE FOR ADAPTING CONTINUOUSLY VARIABLE TRANSMISSIONS TO INFINITELY VARIABLE TRANSMISSIONS WITH FORWARD-NEUTRAL-REVERSE CAPABILITIES

[75] Inventors: Donald F. Wilkes; James W. Purvis; A. Keith Miller, all of Albuquerque, N.M.

[73] Assignee: Sandia Corporation, Albuquerque, N.M.

[21] Appl. No.: 511,599

[22] Filed: Aug. 4, 1995

[51] Int. Cl.⁶ .................. F16H 9/26; F16H 37/02
[52] U.S. Cl. .............. 475/211; 474/72; 475/302; 475/339
[58] Field of Search ............. 475/211, 207, 475/210, 302, 339, 343; 474/72

[56] References Cited

U.S. PATENT DOCUMENTS

| | | |
|---|---|---|
| Re. 31,361 | 8/1983 | Smirl . |
| 1,149,816 | 8/1915 | Fay . |
| 1,445,741 | 2/1923 | Blackwell . |
| 1,728,899 | 9/1929 | Hegeler . |
| 1,977,553 | 10/1934 | Halford . |
| 2,161,894 | 6/1939 | Bishop .................. 475/211 |
| 2,164,818 | 7/1939 | Heyer et al. .............. 475/211 |
| 4,392,394 | 7/1983 | Hofbauer . |
| 4,567,789 | 2/1986 | Wilkes . |
| 4,706,518 | 11/1987 | Moroto . |
| 5,033,995 | 7/1991 | Salesse . |
| 5,121,936 | 6/1992 | Cowan . |
| 5,360,380 | 11/1994 | Nottle .................. 475/182 |

OTHER PUBLICATIONS

"Mechanisms and Mechanical Devices Sourcebook", Nicholas P. Chironis, McGraw-Hill, Inc.

Primary Examiner—Charles A. Marmor
Assistant Examiner—Sherry Lynn Estremsky

[57] ABSTRACT

An infinitely variable transmission is capable of operating between a maximum speed in one direction and a minimum speed in an opposite direction, including a zero output angular velocity, while being supplied with energy at a constant angular velocity. Input energy is divided between a first power path carrying an orbital set of elements and a second path that includes a variable speed adjustment mechanism. The second power path also connects with the orbital set of elements in such a way as to vary the rate of angular rotation thereof. The combined effects of power from the first and second power paths are combined and delivered to an output element by the orbital element set. The transmission can be designed to operate over a preselected ratio of forward to reverse output speeds.

12 Claims, 5 Drawing Sheets

DEVICE FOR ADAPTING CONTINUOUSLY VARIABLE TRANSMISSIONS TO INFINITELY VARIABLE TRANSMISSIONS WITH FORWARD-NEUTRAL-REVERSE CAPABILITIES

BACKGROUND OF THE INVENTION

This invention relates generally to mechanical devices for converting an input having a substantially constant angular velocity to an output having a different angular velocity. More particularly, the present invention concerns an infinitely variable transmission in which the output angular velocity is continuously adjustable from a maximum positive value, through the zero output value, and to a maximum negative value.

Speed changing devices are employed in many types of equipment. In a simple transmission, for example, devices are often provided to give one or more discrete output speeds in relation to an input speed. In other equipment, it is necessary to have a wider variety of output speeds available. In such other equipment, the output speed often needs to vary continuously, or infinitely, over the desired speed range while only a constant speed is available as the input. For purposes of this specification, a "simple transmission" is a transmission having one or more discrete output speeds in relation to the input speed—and may include a discrete reverse (or negative) output speed. A "continuously viable transmission" is a transmission in which the ratio of output angular velocity to input angular velocity can be varied continuously from a first value to a second value—both having the same algebraic sign. A "continuously variable transmission" may also include a discrete reverse gear—having an algebraic sign different from the first and second values. An "infinitely variable transmission" is a transmission in which the ratio of output angular velocity to input angular velocity can be varied continuously from a first value to a second value—where the first and second values have different algebraic signs. Thus, the "infinitely variable transmission includes the "infinite" condition where the ratio of the input angular velocity to the output angular velocity is undetermined, i.e., ∞.

One of the more common continuously variable speed changing devices employs a fixed length V-belt and a pair of cooperating pulleys. The pulleys may have the ability to adjust the V diameter on which the belt operates in order to obtain a variable output speed. Typically, one such adjustable pulley mechanism is driven while another adjustable pulley mechanism is spring-loaded to maintain tension on the V-belt and to make the second adjustable pulley mechanism responsive to changes made in the first driven adjustable pulley mechanism. It will be appreciated by those skilled in the art that there is a practical mechanical limit to such devices, e.g., where the V-belt cannot be wrapped around a very small diameter shaft.

A somewhat analogous speed changing device employs a variable V-drive in combination with another traction driven fixed-width drum. Sometimes a plurality of these drums are employed to increase the maximum power transmission capability. These devices occasionally use elements packaged in planetary movement arrangements with one device at the center and a multiplicity of encircling meshing elements having planetary movements.

Another class of variable speed drives can be characterized as the ball and disc type. In this class of drive mechanism, the rotational axis for a ball element is usually at a substantially right angle to the rotational axis of a disc element. The ball element which has a surface of revolution is positioned so that when it is pressed against the rotating disc element, the ball element is driven by the disc. By moving the ball element along a radius of the disc element, a variable speed drive can be obtained from the ball element.

Another class of speed regulation employs purely inertial devices. Flywheel governors are common examples of inertial devices that have been used to control internal combustion engine speed under varying load conditions for many years.

Each of the various infinitely adjustable speed changing devices currently available have various problems and limitations. One common problem is the presence of residual slippage between traction elements. Such slippage is undesirable since it wastes energy, generates heat, promotes wear, and increases working clearances.

Another common problem is that many of the materials commonly used to fabricate components of variable speed devices are subject to rapid wear. As a result, the devices experience increased clearances with attendant noise, slippage and reduced efficiency. Wear also tends to create objectionable dirt and particles resulting from degradation of the materials.

Many available speed changing devices also exhibit poor power transmission capability for the spatial volume which they occupy. That is, a large and usually heavy transmission is needed to transmit modest power levels. As a result, to transmit large amounts of power, a physically large transmission is required, adding to the weight of the device.

Many of the available speed changing devices also fail to provide the ability to reverse the direction of output rotation while the input operates at a uniform speed in a constant direction. This capacity can be desirable for example in motorized vehicles where a constant speed input could be varied so as to provide both forward and reverse drive speeds.

Most known transmission systems are also critically dependent upon lubrication, cleanliness or transmission fluids in order to provide and maintain their speed change capability. In many desirable applications of variable speed transmissions, it is extremely difficult, if not impossible, to lubricate or maintain cleanliness.

Another deficiency of most known speed change devices is the necessity for a clutch to permit the output speed or angular velocity to go to zero (i.e., stop) while the power supply is still operating. Clutches clearly introduce additional complexity into a system as well as expense, bulk, and weight. In a similar vein, most known devices which do permit a zero output speed lack sufficient traction at that speed to be useful. Traction near zero is necessary in order to create useful starting movement without slippage in the transmission device, and to produce braking through the internal deceleration of components.

Still further, most known devices are unable to run at the maximum speeds that could be advantageous for many applications. This inability to run at high speed is often a result of the fact that locally generated heat can devulcanize rubber, soften heat-treated materials, generate noise, and cause vibrations as well as other undesirable effects.

The control of known variable speed devices has also been a problem. More particularly, most devices do not have a sufficiently sensitive control that can produce small changes in the output speed settings. In many useful applications for variable speed devices, such sensitivity to small changes in response are highly desirable.

Conversion of an input angular velocity to a variable output angular velocity is, of course, the purpose of myriad transmission devices. With automotive transmissions, the input angular velocity is directly connected to the output so that the output angular velocity varies in direct relationship to the input angular velocity variation. In such transmissions, it is necessary to provide a clutch mechanism so that the output angular velocity can be zero while the input angular velocity is non-zero. Shifting between predetermined gear ratios simply changes the proportionality constant between the input and output angular velocities.

One known device for infinitely varying the speed of an output member while an input operates at a constant speed employs a reflexively curved endless metal band. Such a device is capable of generating both forward and reverse direction, including the zero output speed while the input continues to operate at a constant speed. See, U.S. Pat. No. 4,567,789, issued to D. F. Wilkes, on Feb. 4, 1986. Such a device, however, relies upon an endless metal band—which has not yet been reduced to actual practice.

Other transmissions are known in which planetary gear systems are used between an input and an output to effect speed differences. For example, in U.S. Pat. No. 1,149,816, issued to Fay on Aug. 10, 1915, an input shaft drives an auxiliary shaft by a meshed gear set. In addition, the input shaft drives a sun gear meshed with planetary gear sets carried by a second sun gear journaled to the output shaft. That second sun gear is driven by a pinion carried by the auxiliary shaft. Finally, the output shaft is driven by a third sun gear meshed with the planetary gear set. The Fay device, however, operates at a single speed. While other embodiments permit operation at different speeds, those different speeds are obtained by selective engagement of set screws. The Fay device is not arranged to generate different output speeds for a constant input speed.

The Blackwell patent (U.S. Pat. No. 1,445,741) illustrates a planetary gear set carried by a central wheel. A sun gear mounted on the input shaft meshes with the planetary gear set and is driven by a worm gear. That worm gear, in turn is driven from an auxiliary shaft that itself is driven by a gear carried by the output shaft. The output shaft is driven by a sun gear meshed with the planetary gear set. Here again, them is no mechanism for generating different output speeds for a constant input speed.

Other speed transmission devices are also known including, for example, U.S. Pat. No. 1,728,899 issued to Hegeler et al., U.S. Pat. No. 1,977,553 issued to Halford, and U.S. Pat. No. 5,033,995 issued to Salesse.

Various speed changing devices are also known which use variable pulley belt drives in association with geared systems. See for example, U.S. Re. Pat. No. 31,461 issued to Smirl, U.S. Pat. No. 5,121,936 issued to Cowan, U.S. Pat. No. 4,392,394 issued to Hofbauer et at., and U.S. Pat. No. 4,706,518 issued to Moroto et at. An epicyclic transmission is also known which generates variable output speeds without using variable pulley belt drives. See for example, U.S. Pat. No. 5,360,380 issued to Nottle.

OBJECTS AND SUMMARY OF THE INVENTION

A general object of the present invention is to provide an adapter unit for continuously variable transmissions which can operate with any power source generating a constant or substantially constant input angular velocity and provide an output angular velocity that varies from forward to reverse, through zero (i.e., a complete stoppage), all the while permitting the input power source to continue operation.

Another general object of the present invention is a transmission adapter unit which includes conventional hardware items and which permits the adapter to produce infinitely adjustable output angular velocities ranging from forward to reverse and through zero. The ability to go monotonically through zero eliminates shock loading and energy losses such as are commonly due to clutches and gear teeth interaction. Further, smooth monotonic changes through zero provide for true infinite gear ratios, rather than specific limited gear ratio ranges such as are common for existing constantly variable transmissions (CVTs). A "monotonical" variation for purposes of this specification includes monotonically increasing functions as well as monotonically decreasing functions. A monotonically increasing function is one where $f(y) \geq f(x)$ when $y>x$. Conversely, a monotonically decreasing function is one where $f(y) \leq f(x)$ when $y>x$.

An infinitely variable transmission adapter device which accomplishes those and many other objectives and advantages includes an input shaft for providing an input angular velocity. The input shaft includes a driving gear. An orbital gear system is rotatably mounted to the driving gear and to an output shaft. The orbital gear system travels around the input shaft. The driving gear simultaneously drives the input of a variable ratio system. The output of the variable ratio system is input to the orbital gear system independently of the input angular velocity. The transmission arrangement permits the output shaft to be driven from forward angular velocities to reversed angular velocities, through the zero output angular velocity. Provided that the input variable ratio system is continuously variable, the output angular velocity variation can also be infinitely variable between its forward and reverse speed limits.

A suitable continuously variable ratio system for incorporation into the present infinitely variable transmission adapter device includes a variable diameter driving pulley connected to a variable diameter driven pulley by means of a flexible but inextensible belt. Such a continuously variable ratio system is conventionally available, and the adapter converts this system so as to operate with infinite variability, including full stop and reverse. The adapter thus allows range of speed changes to be adjusted or tailored for any desired end use.

BRIEF DESCRIPTION OF THE DRAWINGS

Many objects and advantages of the present invention will be apparent to those skilled in the art when this specification is read in conjunction with the attached drawings wherein like reference numerals are applied to like elements and wherein.

DETAILED DESCRIPTION OF THE PREFERRED EMBODIMENTS

An appreciation of the invention that is the subject of this specification can be obtained from consideration of a particular physical embodiment of the invention. The breadth of the invention, however, is best appreciated from consideration of some analytical relationships that pertain to the general class of speed changing devices contemplated herein. Accordingly, a physical embodiment of the invention will be described initially, then a discussion of the analytical relationships will be provided so that the full scope of the invention can be appreciated by those of ordinary skill in the art.

Figure 1:
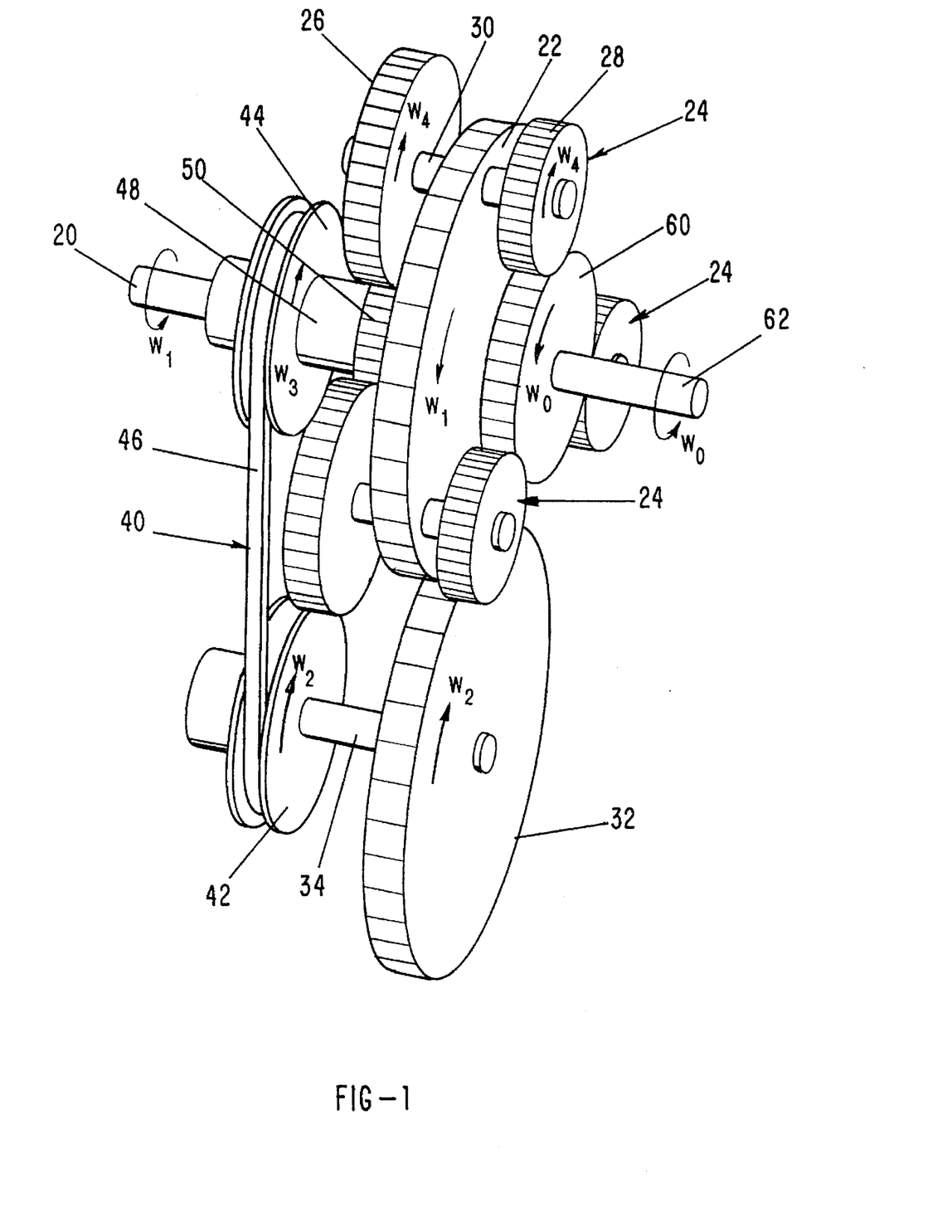
FIG. 1 is a schematic perspective view showing a general arrangement for one embodiment of an infinitely variable transmission device of the present invention.

The overall spatial arrangement of a speed changing device according to the present invention is illustrated schematically in FIG. 1. A power means or source of rotary power (not shown) supplies torque to a transmission. The present invention is well-suited for use with a power source that operates at a constant output speed or angular velocity. A suitable example of such a power source would be an electric motor, a gas turbine engine, or an internal combustion engine operating at constant speed. Nevertheless, the present invention may also be used in combination with variable speed power sources such as internal combustion engines, human powered sources, and the like.

Figure 2:
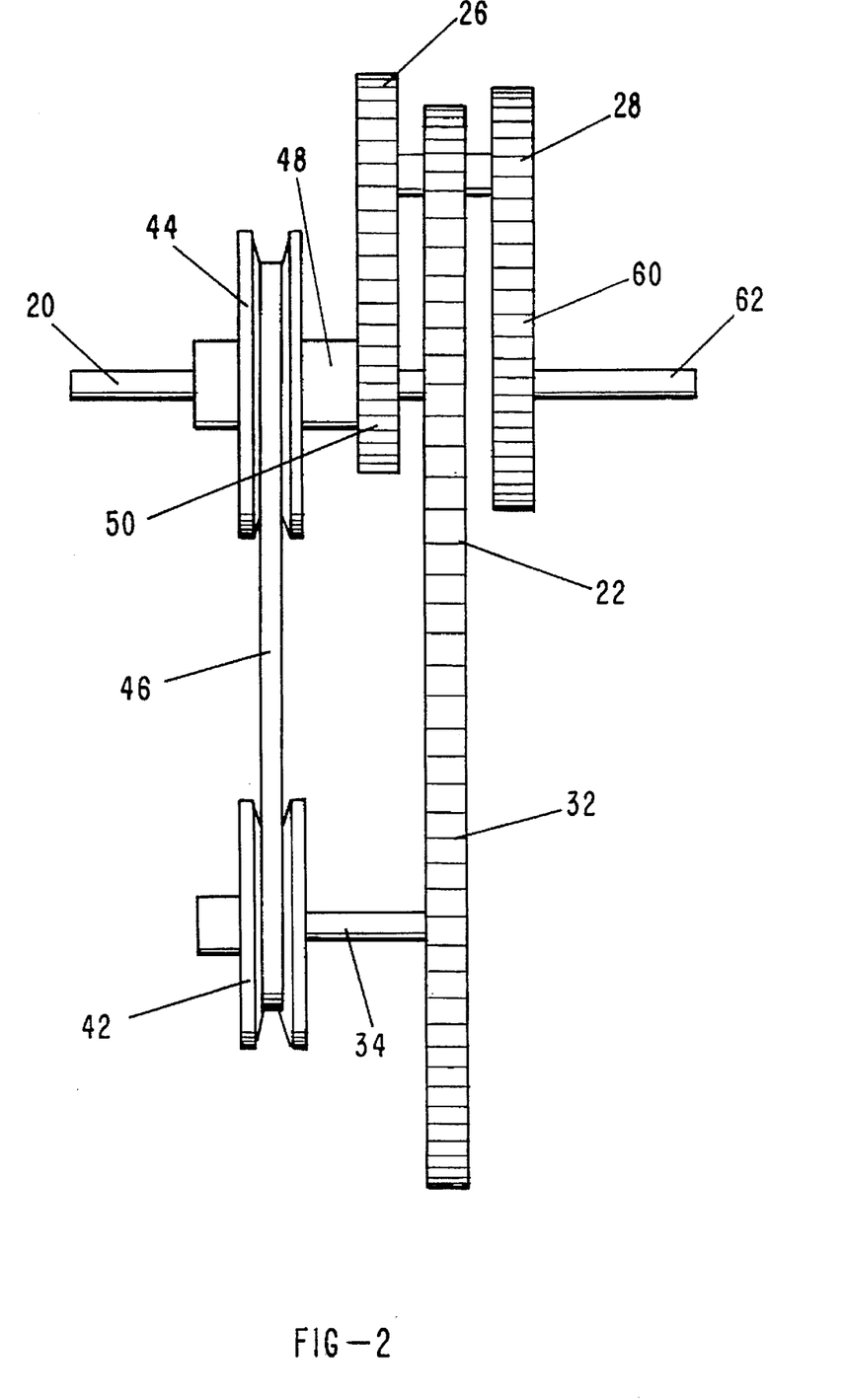
FIG. 2 is a side elevational view of one embodiment of the infinitely variable transmission device of the present invention.

In any event, the power source supplies an input speed or input angular velocity to the transmission. Specifically, the power source drives an input shaft 20 which projects from one side of the transmission. The input shaft 20 is drivingly connected to a first or input sun element 22 in any suitable conventional manner (see FIG. 2). For example, a splined connection, a keyed connection, a shear pin connection, a set screw connection, or the like, between the input shaft 20 and the first sun element 22 would be suitable. As illustrated, the first sun element 22 is attached to the end of the input shaft 20, a location which is convenient for the embodiment illustrated. The peripheral surface of the first sun element 22 may be provided with a multiplicity of gear teeth. Furthermore, the first sun element 22 carries at least one orbital set 24.

Figure 3:
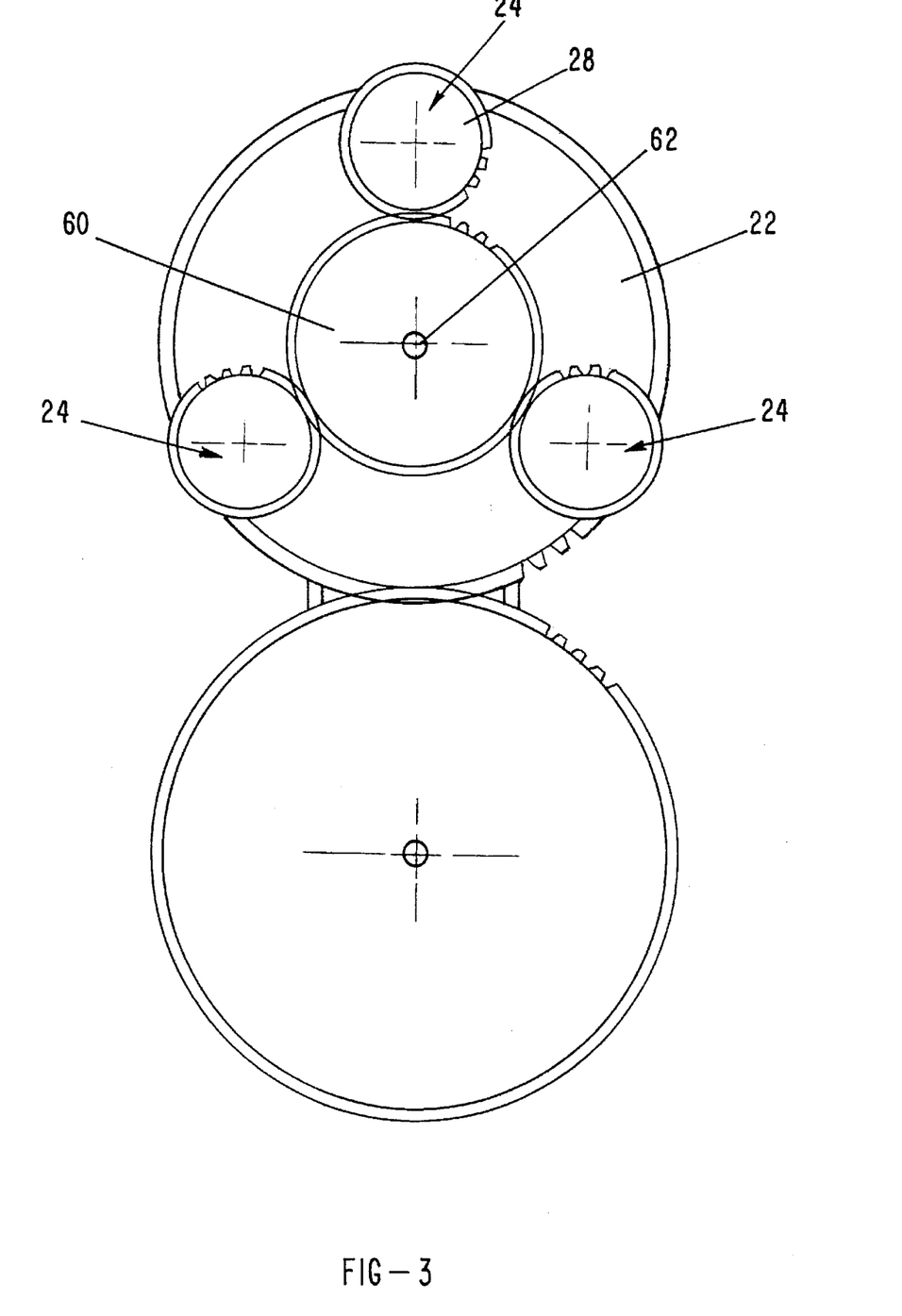
FIG. 3 is an elevational view of the transmission of FIG. 2 from the output end.

For purposes of symmetry and force balancing, the first sun element 22 will normally be provided with a plurality of those orbital sets 24 (see FIG. 1). Where a plurality of orbital sets 24 is used, those orbital sets 24 are preferably spaced along a common radius on the first sun element 22 and equiangularly positioned with respect to the center of that first sun element 22 (see FIG. 3). As illustrated, three orbital sets 24 are provided on the first sun element 22.

Each of the orbital sets 24 (see FIG. 1) is the same as each of the other orbital sets 24 so it will suffice to describe one of them in detail. Each orbital set 24 includes two planetary elements 26, 28 and a shaft 30. The first planetary element 26 has a radius that is larger than the radius of the second planetary element 28. The radii of these planetary elements 26, 28 cannot be the same and have the desired output angular velocity relationships for the illustrated embodiment. Each of the first and second planetary elements is connected to the planetary shaft 30 in a suitable conventional way so that, as the planetary shaft 30 rotates about its longitudinal axis, the first and second planetary elements rotate at the same angular velocity. Splines, keys, shear pins, set screws and the like may be used to effect the connection between the planetary elements 26, 28 and the planetary shaft 30.

As shown, the planetary shaft 30 is rotatably mounted to the first sun element 22. Suitable conventional bearings may be used to mount the shaft 30 to the first sun element 22 so that the axis of the shaft 30 is parallel to the axis of the first sun element 22. The larger planetary element 26 of each orbital set 24 is positioned on one side of the first sun element 22 while the smaller planetary element 28 of each orbital set 24 is positioned on the second, or opposite, side of the first sun element 22. This physical arrangement is convenient since the smaller planetary element 28 adjusts the output angular velocity imparted to an output shaft by the first sun element 22, while the larger planetary element 26 is driven by an adjustable speed arrangement 40 that effects the output angular velocity adjustment.

An input element 32 is positioned adjacent to the first sun element 22 so as to be generally coplanar therewith and so as to have driving peripheral contact therewith. Accordingly, rotation of the first sun element 22 is communicated to the input element 32. However, the angular velocity of the input element 32 will be oppositely directed from the angular velocity of the input sun element 22 and will have a magnitude related to the angular velocity of the first sun element 22 according to the ratio of (i) the radius of the first sun element 22 and (ii) the radius of the input element 32.

Figure 4:
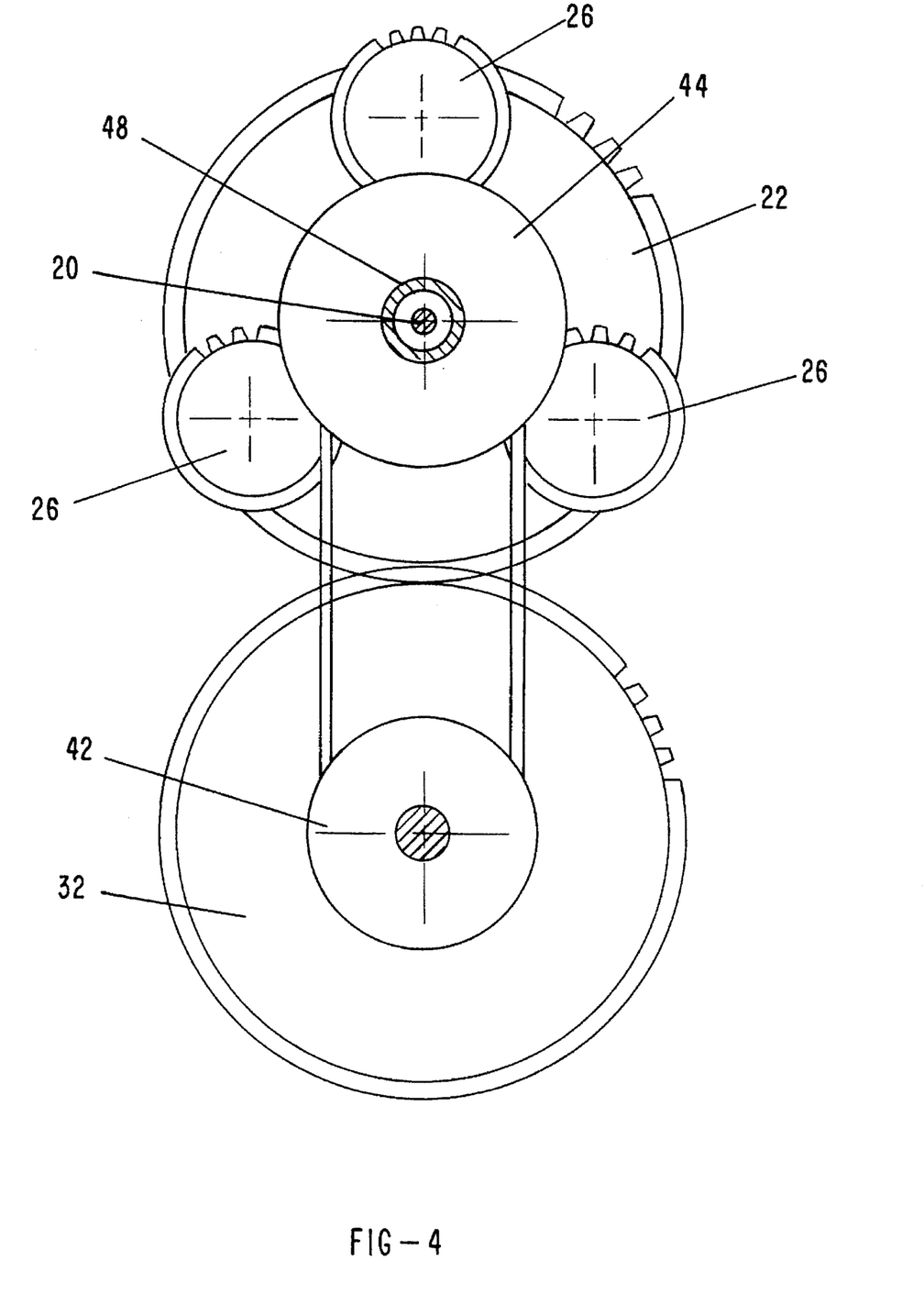
FIG. 4 is an elevational view of the transmission of FIG. 2 from the input end.
Figure 5:
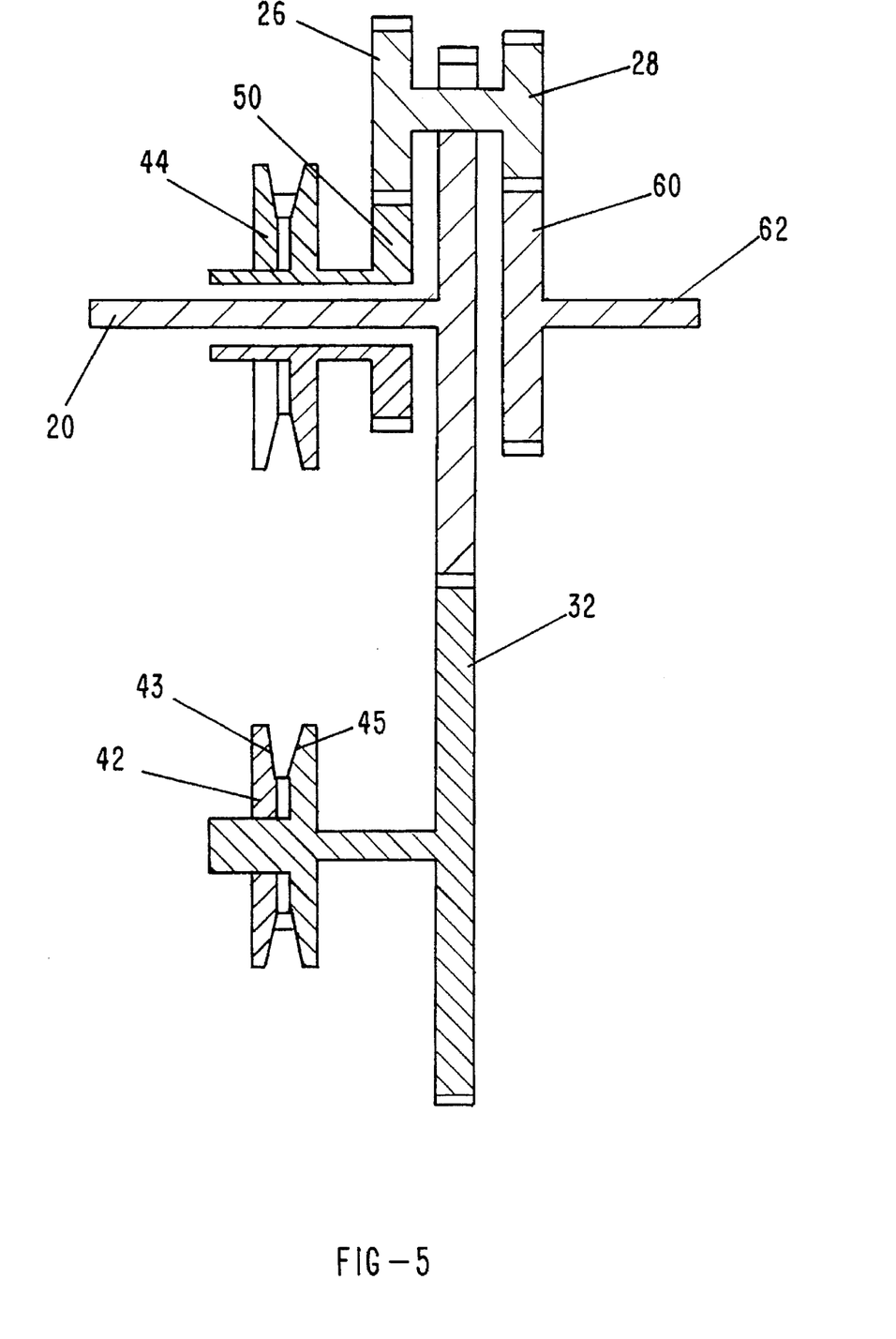
FIG. 5 is a cross-sectional view of the transmission of FIG. 2 taken along the line 5—5 of FIG. 3.

The input element 32 is attached to an auxiliary shaft 34 which is parallel to, but laterally spaced from, the input shaft 20. As with other shaft/element connections, the connection between the auxiliary shaft 34 and the input element may be a suitable conventional connection such as a spline, key, shear pin, or set-screw arrangement. The auxiliary shaft 34 (see FIG. 2) is also connected to the input element of the adjustable speed arrangement 40. The adjustable speed arrangement is a means for varying the relative angular velocities or speeds of two members, the input member and the output member. While a variety of such adjustable speed arrangements are known to those skilled in the art, one particular adjustable speed arrangement has been found to be useful for purposes of this invention, namely a pair of adjustable-diameter pulleys 42, 44 (see FIG. 4) connected by a substantially inextensible, flexible belt 46. Such adjustable-diameter pulleys 42, 44 are typically arranged to handle a belt 46 having a trapezoidal cross section (see FIG. 5) and known as a V-belt. Moreover, the adjustable-diameter pulleys operate by changing the axial spacing between circular pulley portions having opposed frustoconical face portions 43, 45. Since the V-belt is received between the opposed frustoconical face portions, changing the axial spacing between those face portions operates to change the effective radius or effective diameter at which the belt operates in the particular pulley. Typically, the increase in axial spacing of the input pulley 42 is coupled to a decrease in axial spacing in the output pulley 44 so that the path of the V-belt has a constant value. A variety of suitable conventional arrangements are known to those skilled in the art that are suitable for use with this invention. Furthermore, it will be seen that the angular velocity of the input pulley 42 (see FIG. 1) is the same, in both direction and magnitude, as the angular velocity of the input gear 32 and the first auxiliary shaft 34.

In order to provide a good range of torque transmission capabilities for the adjustable speed arrangement 40, it is preferred that the nominal operation condition (i.e., a design point) for the belt/pulley arrangement is described as the situation where the belt 46 operates on the frustoconical surface portions so as to be about half way between the maximum operating radius position and the minimum operating radius position. In this way, the adjustable speed arrangement 40 can operate to both increase and decrease the relative angular velocity of the output pulley 44 relative to the angular velocity of the input pulley 42. For such an adjustable speed arrangement 40 as has been described, the ratio of the output angular velocity (i.e., that of the output pulley 44) to the input angular velocity (i.e., that of the input pulley 42) can be expressed as the ratio of the effective operating radii of the two pulleys (e.g., effective radius of the input pulley 42 divided by the effective radius of the output pulley 44). From the foregoing discussion it will be clear that this ratio is variable.

In the context of an exemplary embodiment of the transmission adapter unit of this invention, the input pulley 42 of the adjustable speed arrangement 40 is connected to the auxiliary shaft 34 in a suitable conventional manner that may, for example, be a spline connection, a key connection, a shear-pin connection, a set-screw connection or the like. Accordingly, the input pulley 42 operates at the same angular velocity as the input element 32.

Now the output pulley 44 of the adjustable speed arrangement 40 is connected to a second auxiliary shaft 48 so as to rotate simultaneously therewith. Thus, a spline connection, a key connection, a shear-pin connection, a set-screw connection or the like would be suitable. The second auxiliary shaft 48 is arranged so as to be coaxial with the input shaft 20. Suitable conventional intershaft bearings may also be provided between the second auxiliary shaft 48 and the input shaft 20, to the extent necessary or desirable.

Also connected to the second auxiliary shaft, in spaced relation to the output pulley 44, is a second sun element 50 that is attached to the second auxiliary shaft 48 in a suitable conventional manner. As with other shaft/element connections, splines, keys, shear pins, set screws, and the like are possibilities for the connection. The second sun element 50 is axially spaced from the first sun element 22 and has a periphery that engages the periphery of each of the first set of planetary elements 26 thereby driving those elements. Thus, the second sun element 50 has an angular velocity that is the same as the angular velocity of the output pulley 44 of the adjustable speed arrangement 40. The angular velocity of the first set of planetary elements 26 with respect to an axis along shaft element 30 has one component related to the angular velocity of the second sun element 50 according to the ratio of (i) the radius of the second sun element 50 divided by (ii) the radius of the first planetary elements 26. The angular velocity of the first set of planetary elements 26 with respect to the axis along shaft element 30 has a second component also related to the angular velocity of the first sun element 22 according to the ratio of (i) the radius of the second sun element 50 divided by (ii) the radius of the first planetary elements 26. The overall angular velocity of the first set of planetary elements 26 is the difference between those components, as is explained more fully below.

As a result of the physical arrangement of elements, the input shaft 20, through the first sun element 22 bodily carries the orbital elements 24 about the axis of the input shaft with an angular velocity that corresponds to the input angular velocity. Simultaneously, the input angular velocity is adjusted by (i) the fixed ratio between the first sun element 22 and the input element 32, (ii) the adjustable ratio provided by the adjustable speed arrangement 40, and (iii) by the fixed ratio between the second sun element 50 and the first set of planetary elements 26.

A third or output sun element 60 is also axially spaced from both the first and second sun elements. As illustrated, the second sun element 50 is located closely adjacent to one side of the first sun element 22 while the third sun element 60 is positioned closely adjacent to the second side of the first sun element 22. The third sun element is in peripheral engagement with the perimeters of each of the second set of planetary elements 28.

The third sun element 60 is attached to an output shaft 62 in a suitable conventional manner such as has been described above for connections between rotary elements and shafts. Accordingly, the output shaft 62 operates at the same angular velocity or speed as does the third sun element 60. However, the angular velocity of the third sun element 60 is a function of both the input angular velocity (at which the orbital elements revolve around the axis of the input shaft 20) and the variable angular velocity of the first and second planetary element sets (at which the planetary elements 26, 28 revolve around the respective axes of their respective shafts 30).

Physical sizing of the various elements is important to providing the desired relationship of an output angular velocity for the shaft 62 which can vary from forward to reverse, passing through zero, while the input angular velocity of the shaft 20 may remain constant. For the particular embodiment illustrated, (a) the first sun element 22 and the input element 32 have the same radius, (b) the ratio of the radius of the second sun element 50 to the radius of the first planetary element 26 is 2/3, (c) the ratio of the radius of the second planetary elements 28 to the radius of the third sun element 60 is 3/4, and (d) the ratio of the effective radius of the input pulley 42 to the effective radius of the output pulley 44 is designed so as to fall in the range of 0.5 to 1.5. These ratios may, however, may be varied according to desired configuration as long as they fit constraints which will be described later.

It will be apparent from the foregoing discussion that the various rotary elements of the embodiments disclosed are described with sufficient generality that they may include members having frictionally engaging peripheral surfaces. Normally, however, it is expected that the peripheral surfaces of the various rotary members have suitably designed gear teeth that mesh with gear teeth of adjacent gears in order to ensure a positively fixed relationship for the various constant gear ratios. To this end, it will be seen that peripheral surface of the first sun element 22 (see FIG. 5) has teeth which mesh with teeth on the peripheral surface of the input element 32; the peripheral surface of the second sun element 50 has teeth which mesh with teeth on the peripheral surface of each of the first planetary elements 26; and, the peripheral surface of each of the second planetary elements 28 has teeth which mesh with teeth on the periphery of the third sun element 60.

Furthermore, it will be noted that the particular shape of the various rotary elements 22, 24, 26, 32, 50, and 60 and their corresponding shafts 20, 30, 34, 48, 62 is not critical. The gears may be fashioned as disks, gear rims carried by radial arms extending from a hub, or any of the myriad gear shapes known to those skilled in the art. Moreover, while the generality of connection between the gears and their associated shafts is stated with generality above, it should be understood that the one or more of the gears may actually be integral with their corresponding shaft, provided that assembly can be effected.

The transmission illustrated, with the physical characteristics described, can provide an output angular velocity that is variable between a predetermined value in one direction, and an equal predetermined value in the opposite direction, with zero output angular velocity occurring at some point between the two.

Turning now to an analytical discussion of the invention will be helpful to define the scope of the invention, as previously noted. For purposes of this discussion, it will be assumed that the input angular velocity is in the clockwise direction. Thus, clockwise angular velocities are considered to be positive, while counterclockwise angular velocities are considered to be negative.

The source of rotary power, such as, for example, a suitable conventional internal combustion engine, or an electrically driven motor, provides power to the input shaft so that the input shaft rotates at a substantially constant input angular velocity, $\omega_i$ (see FIG. 1). The input shaft is rigidly connected to the first sun element 22. Accordingly, the input sun element also rotates as the same constant angular velocity, $\omega_i$. The input sun element drives the input element 32 in a counterclockwise direction at a substantially constant angular velocity, $\omega_2$, which can be expressed in terms of the radii of the input sun element 22, $R_{22}$, and the input element 32, $R_{32}$, as follows:

$$\omega_2 = -\frac{R_{22}}{R_{32}} \omega_i$$

Now, the V-belt drive pulley 42 is attached to the input element 32 by the first auxiliary shaft 34. Thus, the driving V-belt pulley 42 has the same angular velocity as the input element 32, namely $\omega_2$. In addition, the V-belt drive pulley 42 drives the driven V-belt pulley 44 through operation of the suitable conventional V-belt 46 connected between the driving pulley 42 and the driven pulley 44. The angular velocity $\omega_3$, of the driven pulley 44 can be expressed in terms of the effective pulley radius $R_{42}$, of the driving pulley 42, the effective pulley radius $R_{44}$, of the driven pulley 44, and the angular velocity $\omega_2$, of the input element 32 in the following terms:

$$\omega_3 = \frac{R_{42}}{R_{44}} \omega_2$$

The driven V-belt pulley 46 is attached to the second auxiliary shaft 48 that, in turn, is also connected to a second sun element 50. Accordingly, the second sun element 50 also turns at the angular velocity $\omega_3$, of the driven pulley 44.

Now the angular velocity, $\omega_4$, of the first planetary element 26 can be expressed in terms of the radius of the second sun element 50, $R_{50}$, the radius of the first planetary element 26, $R_{26}$, the input angular velocity $\omega_i$, and the angular velocity of the second sun element 50, $\omega_3$, in the following terms:

$$\omega_4 = +\frac{R_{50}}{R_{26}} (\omega_i - \omega_3)$$

The angular velocity, $\omega_0$, of the third sun element 60 can be expressed in terms of the input angular velocity, $\omega_i$, the angular velocity of the planetary elements 26, 28, $\omega_4$, the radius of the second planetary element 28, $R_{28}$, and the radius of the third sun element 60, $R_{60}$, as follows:

$$\omega_o = \omega_i - \frac{R_{28}}{R_{60}} \omega_4$$

By substituting (i) the expression for $\omega_2$ into the expression for $\omega_3$, (ii) the expression for $\omega_3$ into the expression for $\omega_4$, and (iii) the expression for $\omega_4$ into the expression for $\omega_0$, the following equation is obtained which relates the output angular velocity to the input angular velocity:

$$\frac{\omega_0}{\omega_i} = 1 - \frac{R_{28}}{R_{60}} \frac{R_{50}}{R_{26}} \left(1 + \frac{R_{22}}{R_{32}} \frac{R_{42}}{R_{44}}\right)$$

The following expressions are useful substitutions for the foregoing expression. The adjustability ratio, V, is defined as follows:

$$V = \frac{R_{42}}{R_{44}}$$

The product of the planetary ratios, A, is defined as follows and is a constant for any particular design:

$$A = \frac{R_{28}}{R_{60}} \frac{R_{50}}{R_{26}}$$

The ratio, B, of the first sun element 22 to the input element 32 is defined as follows and is also a constant for any particular design:

$$B = \frac{R_{22}}{R_{32}}$$

The ratio of the output angular velocity to the input angular velocity can be expressed in terms of A, B, and V as follows:

$$\frac{\omega_0}{\omega_i} = 1 - A - ABV$$

Since the transmission is to include an output angular velocity of zero, it can be shown that the planetary product defined as the product (a) the ratio of the radius of the second sun element 50 to the radius of the first planetary element 26 and (b) the ratio of the radius of the second planetary element to the third sun element 60 must be greater than zero and less than one, i.e., $$0 < A < 1$$

Moreover, since the foregoing relationship must be less than one, a transmission in which the first and second planetary elements 26, 28 have the same radius will not permit operation at an output velocity of zero, because the second sun element 50 and the third sun element 60 would necessarily have the same radius and the planetary ratio would then be 1.0.

The adjustability ratio, V, will have a value V* when the output angular velocity is zero, a value $V_{min}$ when the output velocity is a maximum (i.e., positive, and a value $V_{max}$ when the output angular velocity is a minimum (i.e., negative). Then it can be shown that for the output to have both positive and negative values (i.e., for both forward and reverse directions), the planetary ratio must satisfy the following equality:

$$A = \frac{1}{1 + V^*B}$$

For the purposes of illustration, choose convenient design values as follows:

$$\frac{R_{50}}{R_{26}} = \frac{2}{3} \quad \frac{R_{28}}{R_{60}} = \frac{3}{4}$$

-continued $$A = \frac{1}{2} \quad B = \frac{R_{22}}{R_{32}} = 1$$

With these expressions, then:

$$\frac{\omega_o}{\omega_i} = \frac{1}{2}(1-V)$$

It is readily apparent then that the transmission adapter produces zero output angular velocity when the following equation is satisfied, $V^*=1$, and positive output angular velocity when the following inequality is satisfied, $V<1$, and negative output velocity when the following inequality is satisfied, $V>1$.

Another useful relationship is obtained by recognizing that Z, defined here as the ratio of the maximum output angular velocity to the minimum output angular velocity, can be expressed in terms of defined ratios A, B and V to give the following relationships:

$$Z = \frac{1 - A - ABV_{min}}{1 - A - ABV_{max}}$$

$$A = \frac{(Z-1)}{(Z-1+ZBV_{max}-BV_{min})}$$

$$B = \frac{Z-1-ZA+A}{ZAV_{max}-AV_{min}}$$

From the foregoing relationships, it is seen that a transmission having the desired characteristics can be designed according to one's preferences. For example, by selecting the ratio Z of the maximum output angular velocity to the minimum output angular velocity (a negative number since the directions are different), and then selecting the values for $V_{min}$ and $V_{max}$, only the values of A and B remain to be determined. The ratio B is a typical starting place since it effectively defines the maximum transverse or diametrical extent of the transmission. With that information, the value of A is selected from the expression above and only the proportioning of the second and third sun elements 50, 60, and the first and second planetary elements, 26 and 28 remains to be done. The ratios of those members must be combined to give A as the planetary ratio.

In view of the foregoing, it will now be apparent that a transmission has been described which overcomes problems and disadvantages of prior art devices and which permits a transmission to operate continuously from forward to reverse, through zero, while being supplied with a constant input angular velocity. Moreover, it will be apparent to those skilled in the art that there are numerous modifications, variations, substitutions and equivalents for the various elements and limitations of the invention described herein. Accordingly, it is expressly intended that all such modifications, variations, substitutions and equivalents that fall within the spirit and scope of the invention as defined by the appended claims be embraced thereby.

What is claimed is:

1. A transmission of infinitely varying output speed ratios between a maximum value in one direction and a minimum value in the opposite direction, including a zero output angular velocity value, comprising:

a sun element operable about a first axis at a first angular velocity;

an output element arranged for rotation about a second axis colinear with the first axis of rotation;

at least one orbital set of elements, rotatable about a planetary axis parallel to the first axis of rotation, spaced therefrom, and carried through a path of constant radius by the sun element, the orbital set including a first planetary element having a first radius and a second planetary element having a second radius, the second radius being less than the first radius, and the second planetary element positioned to transmit power to the output element;

a first auxiliary shaft, parallel to the first axis of rotation, driven by the sun element at an angular velocity oppositely directed to the input angular velocity;

means including an input member, an output member, and a member for transmitting torque therebetween, the means being operable for varying the angular velocity of the of the output member relative to the angular velocity of the input member, wherein the first auxiliary shaft drives the input member;

a second auxiliary shaft, parallel to the first axis of rotation and driven by the output element of the means for varying angular velocity, and arranged so as to drive the first planetary member at an angular velocity determined by the means for varying;

whereby power from the sun element is divided between a first path which carries the orbital element set and a second path including the means for varying, the power from the first and second paths being joined at the orbital element set connected with the output element such that the output element can operate at an angular velocity of zero while the input element is driven at continuous speed.

2. The transmission according to claim 1 wherein the first auxiliary shaft is driven from the sun element through an input member, the input member having a radius no greater than the radius of the sun element.

3. The transmission according to claim 1 wherein the means for varying includes a pair of variable diameter pulley members and a V-belt member for transmitting torque therebetween.

4. The transmission according to claim 3 wherein the pair of pulley members have the same diameter and wherein the V-belt member cooperates with the pulley members at the zero output angular velocity condition such that the ratio of input to output angular velocity for the means for varying is 1.

5. The transmission according to claim 4 wherein the ratio of input-to-output angular velocity for the means for varying operates between values of 1.5 and 0.5.

6. The transmission according to claim 3 wherein the second auxiliary shaft carries a second sun element, the second sun element having a radius smaller that the radius of the first planetary element.

7. The transmission according to claim 6 wherein the output element has a radius and the second planetary element has a radius which is smaller than the radius of the output element.

8. The transmission according to claim 7 wherein the product of (i) the ratio of the radius of the second sun element to the radius of the first planetary element and (ii) the ratio of the radius of the second planetary element to the radius of the output element is less than 1.

9. The transmission according to claim 1 wherein the first sun element is a sun gear, and wherein the first and second planetary elements are first and second gears.

10. The transmission according to claim 1 wherein the second auxiliary shaft includes a second sun element, wherein the first auxiliary shaft includes an input element driven by the sun element, and wherein the sum of (i) the radius of the sun element and the radius of the input element is greater than the sum of (i) the radius of the second sun gear and (ii) the radius of the first planetary member.

11. The transmission according to claim 1 wherein the sun element is driven by an input shaft, and wherein the second auxiliary shaft is collinear with the input shaft and is mounted thereon.

12. The transmission according to claim 1 wherein the first angular velocity is substantially constant.

* * * * *